(12) United States Patent
Miyagi et al.

(10) Patent No.: US 12,452,710 B2
(45) Date of Patent: Oct. 21, 2025

(54) METHOD AND APPARATUS FOR DETECTING DETERIORATION FACTOR OF WIRELESS QUALITY

(71) Applicant: NTT, Inc., Tokyo (JP)

(72) Inventors: Toshifumi Miyagi, Musashino (JP); Kazuo Osaka, Musashino (JP); Hiroyuki Furuya, Musashino (JP); Hitoshi Hasegawa, Musashino (JP); Hayato Fukuzono, Musashino (JP); Fumiaki Nagase, Musashino (JP); Yu Ono, Musashino (JP); Keita Kuriyama, Musashino (JP)

(73) Assignee: NTT, Inc., Tokyo (JP)

( * ) Notice: Subject to any disclaimer, the term of this patent is extended or adjusted under 35 U.S.C. 154(b) by 427 days.

(21) Appl. No.: 17/928,826

(22) PCT Filed: Jun. 5, 2020

(86) PCT No.: PCT/JP2020/022328
§ 371 (c)(1),
(2) Date: Nov. 30, 2022

(87) PCT Pub. No.: WO2021/245914
PCT Pub. Date: Dec. 9, 2021

(65) Prior Publication Data
US 2023/0217281 A1    Jul. 6, 2023

(51) Int. Cl.
*H04W 24/00*    (2009.01)
*H04W 24/08*    (2009.01)

(52) U.S. Cl.
CPC .................................. *H04W 24/08* (2013.01)

(58) Field of Classification Search
CPC ..... H04W 24/08; H04W 24/00; H04B 17/345
See application file for complete search history.

(56) References Cited

U.S. PATENT DOCUMENTS

| 2002/0142744 | A1   | 10/2002 | Okanoue et al. |          |
|--------------|------|---------|----------------|----------|
| 2002/0169601 | A1 * | 11/2002 | Nishio         | G10L 19/032 |
|              |      |         |                | 704/205  |
| 2008/0167943 | A1 * | 7/2008  | O'Neil         | G06Q 30/08 |
|              |      |         |                | 705/7.29 |
| 2013/0295977 | A1 * | 11/2013 | Salamitou      | H04B 7/2603 |
|              |      |         |                | 455/507  |

(Continued)

FOREIGN PATENT DOCUMENTS

| JP | 2002290343  |   | 10/2002 |          |
|----|-------------|---|---------|----------|
| JP | 2007312078  |   | 11/2007 |          |
| JP | 2010233187  | A * | 10/2010 | H04L 43/16 |

*Primary Examiner* — Lan-Huong Truong
(74) *Attorney, Agent, or Firm* — Fish & Richardson P.C.

(57) ABSTRACT

A wireless quality degradation factor detection method according to an embodiment includes a spectrum generation step of generating a spectrum based on a received radio wave, a determination step of determining whether or not information based on the generated spectrum contains a factor that prevents maintenance of the quality of the received radio wave based on a determination criterion specified in advance, an identification step of identifying the factor that prevents maintenance of the quality of the received radio waves based on the result of the determination and the determination criterion, and an output step of outputting information representing the identified factor.

15 Claims, 11 Drawing Sheets

(56) References Cited

U.S. PATENT DOCUMENTS

| | | | |
|---|---|---|---|
| 2018/0184430 A1* | 6/2018 | Das | H04L 43/16 |
| 2019/0007159 A1* | 1/2019 | Dufour | E21B 47/12 |
| 2020/0267797 A1* | 8/2020 | Wei | H04W 72/21 |

* cited by examiner

Fig. 6
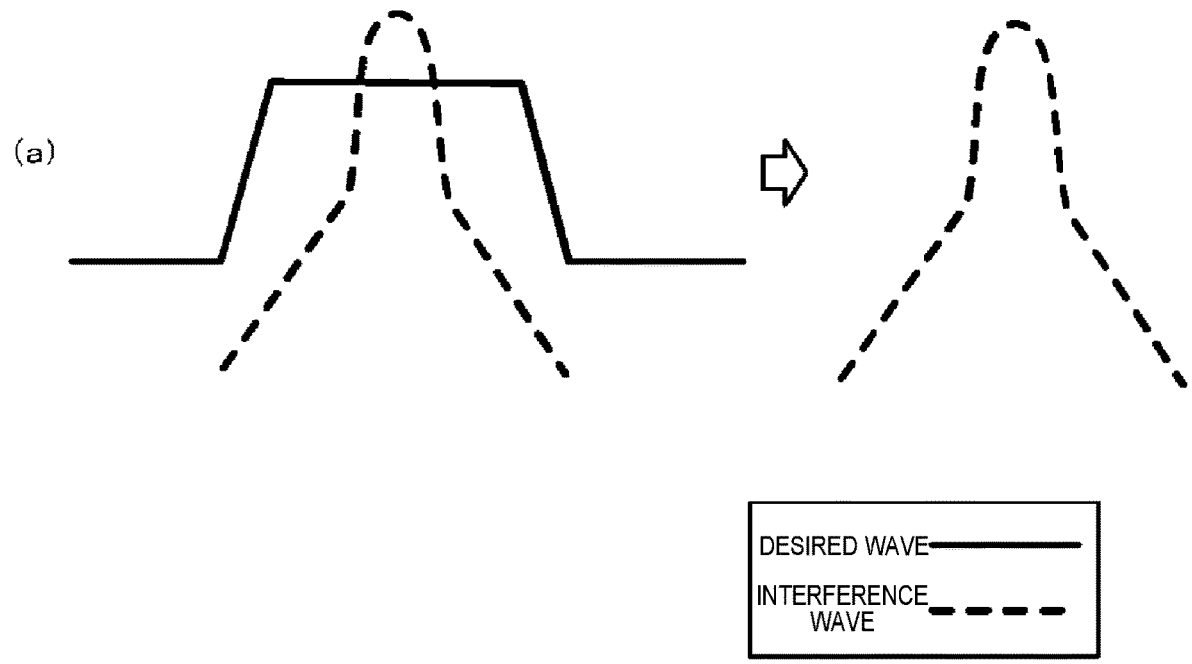
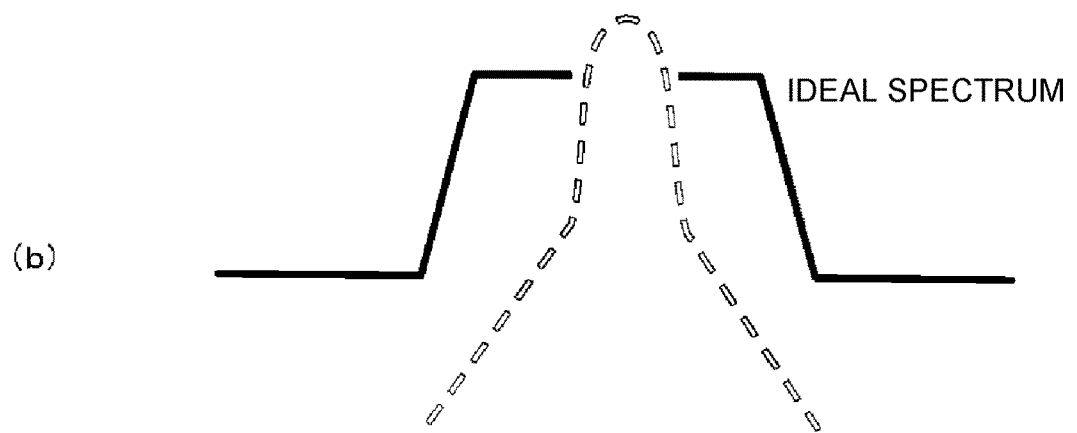
IDEAL SPECTRUM

Fig. 9
(A) 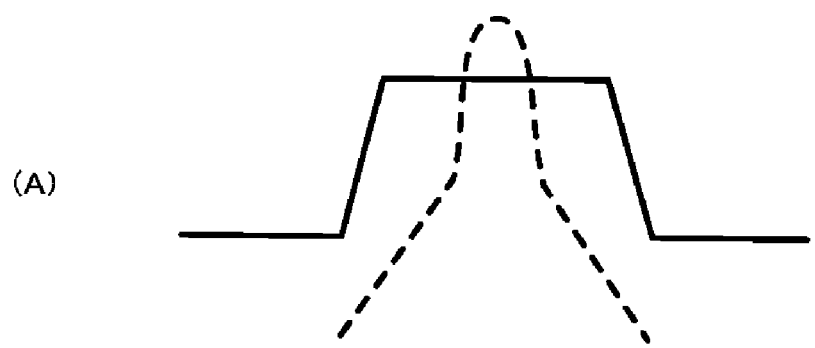
(B) 
(C) 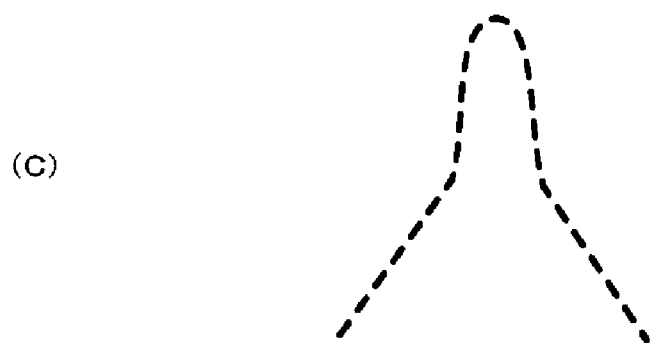
(D) 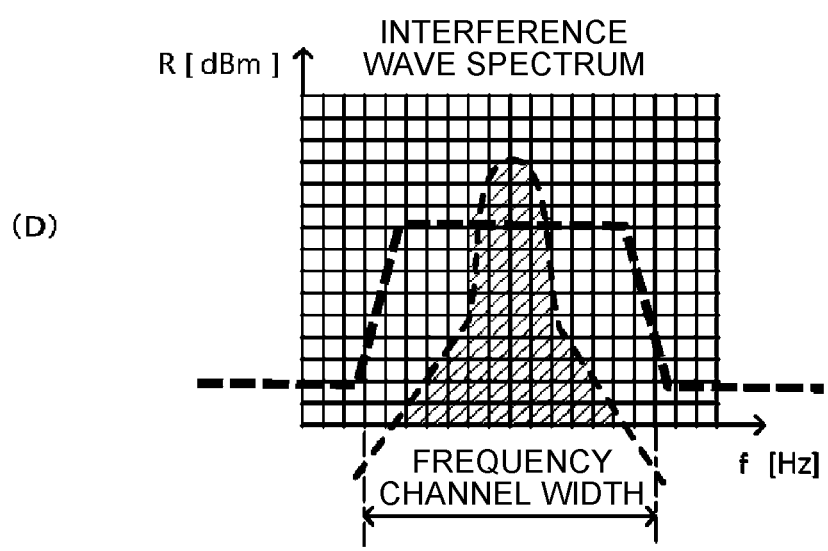
(E) 

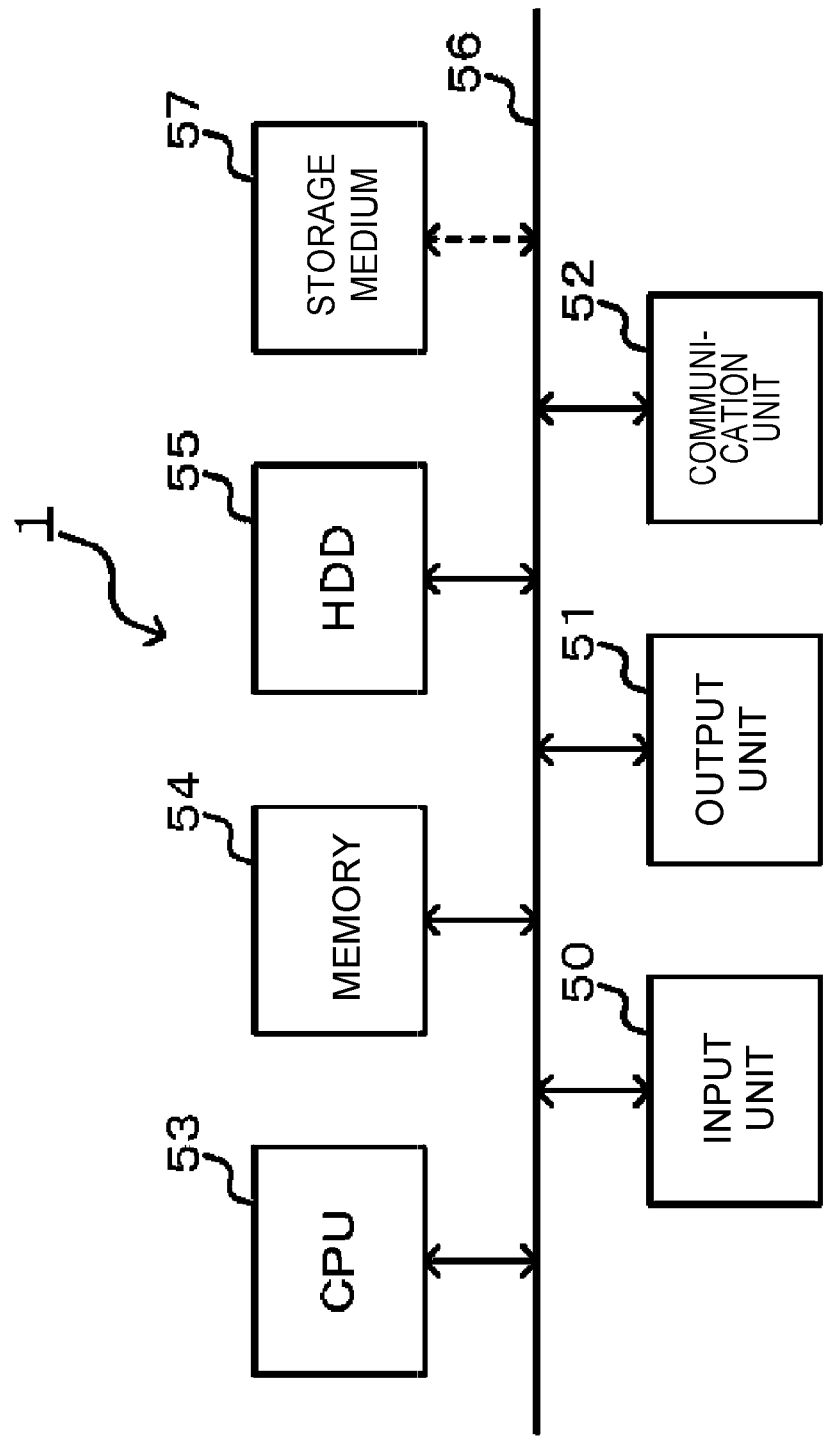

METHOD AND APPARATUS FOR DETECTING DETERIORATION FACTOR OF WIRELESS QUALITY

CROSS-REFERENCE TO RELATED APPLICATIONS

This application is a National Stage application under 35 U.S.C. § 371 of International Application No. PCT/JP2020/022328, having an International Filing Date of Jun. 5, 2020, the disclosure of which is considered part of the disclosure of this application, and is incorporated by reference in its entirety into this application.

TECHNICAL FIELD

The present invention relates to a wireless quality degradation factor detection method and a wireless quality degradation factor detection device.

BACKGROUND ART

When wireless communication is performed, interference waves and other waves may prevent maintenance of the quality of a received radio wave in some cases. There is a device of related art that detects interference waves and other waves that cause degradation of the quality of a wireless segment by using a wireless reception terminal, such as a software wireless terminal, and notifies the result of the detection.

For example, there is a known wireless terminal configured as follows: In an attempt to initiate communication, carrier sensing is performed in a frequency band to be used, and when no pilot signal or any other signal is present so that demodulation cannot be performed, any received signal is determined to be an illegal radio wave, and interference information detected from the received signal is transmitted to a control station (See Patent Literature 1, for example).

CITATION LIST

Patent Literature

Patent Literature 1: Japanese Patent Laid-Open No. 2007-312078

SUMMARY OF THE INVENTION

Technical Problem

It is, however, difficult for the related-art device to identify a factor of degradation of the quality of the wireless segment. Furthermore, to search for a factor of degradation of the quality of the wireless segment, a maintenance worker having specialized knowledge needs to use a dedicated measurement instrument.

An object of the present invention is to provide a wireless quality degradation factor detection method and a wireless quality degradation factor detection device capable of readily detecting a factor of quality degradation in wireless communication.

Means for Solving the Problem

A wireless quality degradation factor detection method according to an aspect of the present invention includes a spectrum generation step of generating a spectrum based on a received radio wave, a determination step of determining whether or not information based on the generated spectrum contains a factor that prevents maintenance of quality of the received radio wave based on a determination criterion specified in advance, an identification step of identifying the factor that prevents maintenance of the quality of the received radio waves based on a result of the determination and the determination criterion, and an output step of outputting information representing the identified factor.

A radio quality degradation factor detection device according to another aspect of the present invention includes a spectrum generation unit that generates a spectrum based on a received radio wave, a determination unit that determines whether or not information based on the spectrum generated by the spectrum generation unit contains a factor that prevents maintenance of quality of the received radio wave based on a determination criterion specified in advance, an identification unit that identifies the factor that prevents maintenance of the quality of the received radio waves based on a result determined by the determination unit and the determination criterion, and an output unit that outputs information representing the factor identified by the identification unit.

Effects of the Invention

According to the present invention, a factor of quality degradation in wireless communication can be readily detected.

BRIEF DESCRIPTION OF DRAWINGS

FIG. 6(a) diagrammatically shows a case where the desired wave and the interference wave are simultaneously transmitted and the spectrum generated by the spectrum generation unit during the period for which the desired wave is not transmitted, and FIG. 6(b) diagrammatically shows the result of a process performed by the degradation factor detection device in the first action.

FIG. 9 diagrammatically shows the procedure of a fourth action performed by the degradation factor detection device.

FIG. 11 shows an example of the hardware configuration of the degradation factor detection device according to the embodiment.

DESCRIPTION OF EMBODIMENTS

Figure 1:
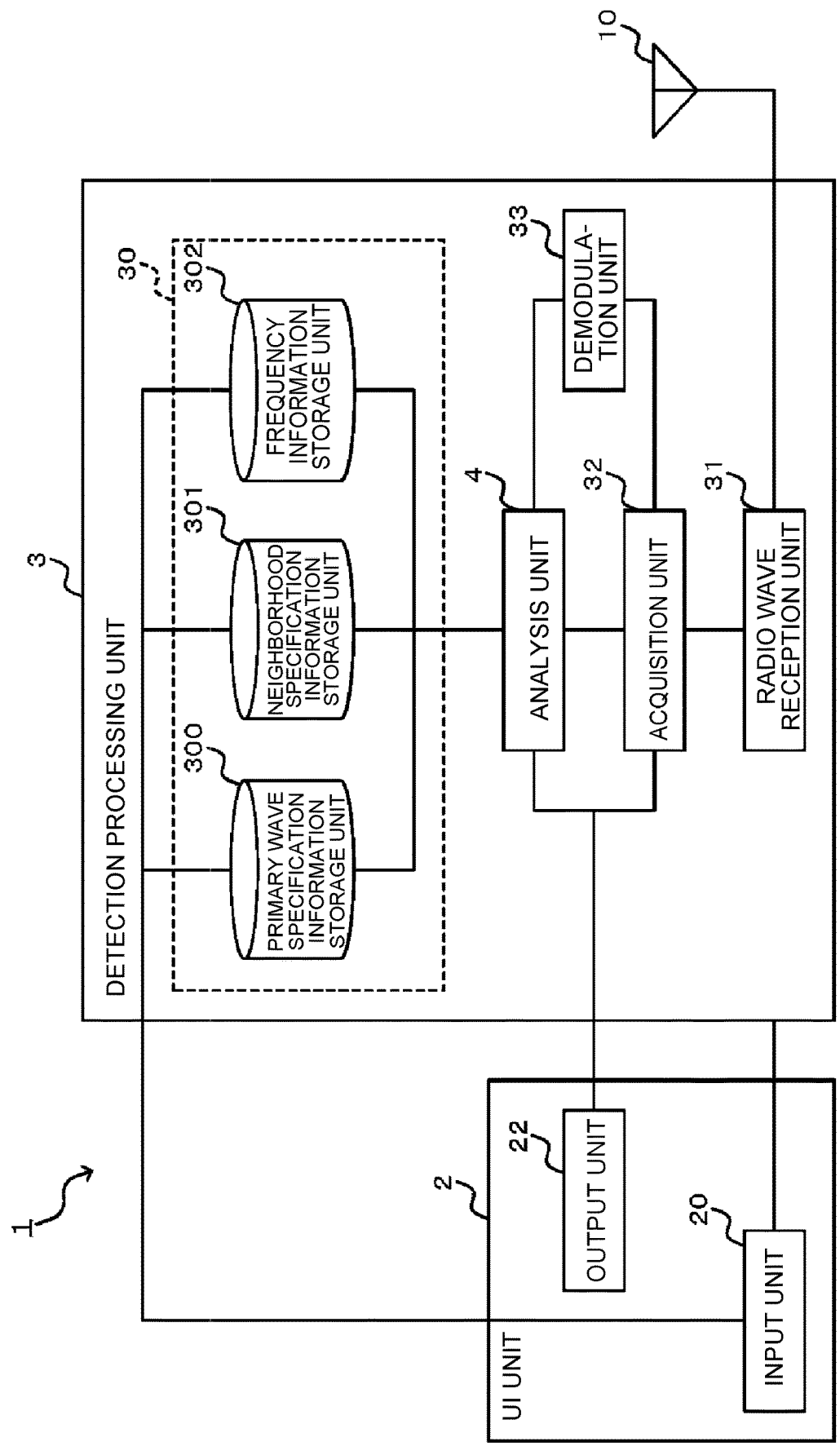
FIG. 1 shows an example of the configuration of a wireless quality degradation factor detection device according to an embodiment.

An embodiment of a radio quality degradation factor detection device will be described below with reference to the drawings. FIG. 1 shows an example of the configuration of a wireless quality degradation factor detection device 1 according to the embodiment. The degradation factor detection device 1 includes an antenna 10, a user interface (UI) unit 2, and a detection processing unit 3, as shown in FIG. 1. The degradation factor detection device 1 performs six actions (first action to sixth action) that will be described later.

The antenna 10 is provided to allow the degradation factor detection device 1 to receive radio waves. The UI unit 2 includes an input unit 20 and an output unit 22. The input unit 20 accepts input of information specified by a user and outputs the inputted information to the detection processing unit 3. The output unit 22 outputs information and the like outputted by detection processing unit 3 to the user with the aid, for example, of display, sound, printing, or transmission. For example, the output unit 22 displays an analysis result including a spectrum that will be described later and outputted by the detection processing unit 3.

The detection processing unit 3 includes a storage unit 30, a radio wave reception unit 31, an acquisition unit 32, a demodulation unit 33, and an analysis unit 4, and the units described above can, for example, input and output information to and from each other. The storage unit 30 includes a primary wave specification information storage unit 300, a neighborhood specification information storage unit 301, and a frequency information storage unit 302.

The primary wave specification information storage unit 300 stores in advance the specifications of a device that transmits or receives a desired wave from which the degradation factor detection device 1 detects a radio wave degradation factor (such as wireless communication device) and the specifications of the desired wave. The primary wave specification information storage unit 300 further stores the spectrum and the frequency channel width of the desired wave in advance. It is assumed that the primary wave specification information storage unit 300 still further store a minimum reception level and other specifications necessary for the device that receives the desired wave to maintain the quality of the received radio wave.

The neighborhood specification information storage unit 301 stores in advance the specifications of a device (such as wireless communication device) that is likely to be located in the neighborhood of the device that receives the desired wave. It is assumed that the neighborhood specification information storage unit 301 further stores the specifications of a radio wave signal (such as synchronization word and spectrum mask) to be transmitted by the device located in the neighborhood of the device that receives the desired wave.

More specifically, the neighborhood specification information storage unit 301 stores the following parameters of the device that is likely to be located in the neighborhood of the device that receives the desired wave in advance in the form of a database: the spectrum masks described, for example, in the examination criteria related to the Radio Law and the report made by a committee of the Ministry of Internal Affairs and Communications; and the synchronization words described in the standard specifications (STD) issued by the Association of Radio Industries and Businesses (ARIB) along with the name of the relevant wireless communication systems.

The frequency information storage unit 302 stores in advance, for example, the bandwidth of the frequency exclusively used by the device (such as wireless communication device) that is likely to be located in the neighborhood of the device that receives the desired wave. For example, the frequency information storage unit 302 stores the frequency channel width (described in examination criteria related to Radio Law) of the device that is likely to be located in the neighborhood of the device that receives the desired wave.

The radio wave reception unit 31 receives a radio wave via the antenna 10 and outputs information indicated by the radio wave (radio wave information) to the acquisition unit 32.

The acquisition unit 32 acquires the radio wave information inputted from the radio wave reception unit 31 and outputs the acquired radio wave information to the demodulation unit 33, the analysis unit 4, and the output unit 22.

The demodulation unit 33 demodulates the desired wave by using the radio wave information inputted from the acquisition unit 32. The demodulation unit 33 then outputs the result of the demodulation of the desired wave and demodulation propriety information representing whether or not the desired wave has been successfully demodulated to the analysis unit 4.

The analysis unit 4 performs analysis that will be described later by using the radio wave information inputted from the acquisition unit 32 and the demodulation result and the demodulation propriety information inputted from the demodulation unit 33, and outputs the result of the analysis to the output unit 22.

Figure 2:
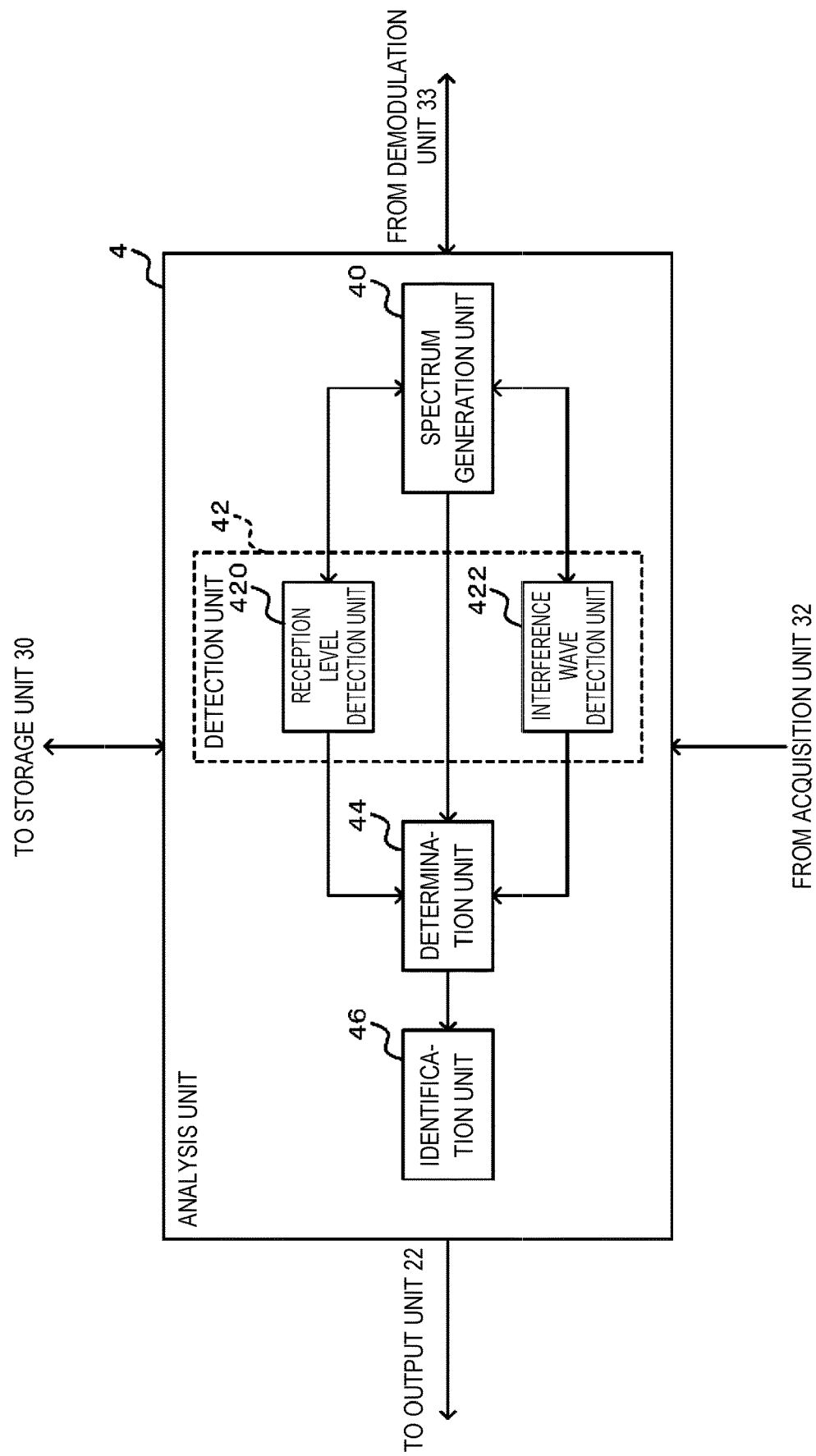
FIG. 2 is a functional block diagram showing an overview of the functions of an analysis unit.

FIG. 2 is a functional block diagram showing an overview of the functions of the analysis unit 4. The analysis unit 4 includes a spectrum generation unit 40, a detection unit 42, a determination unit 44, and an identification unit 46, as shown in FIG. 2.

The spectrum generation unit 40 generates a spectrum based on the received radio wave by using the radio wave information inputted from the acquisition unit 32, and outputs the generated spectrum to the detection unit 42 and the determination unit 44.

For example, the spectrum generation unit 40 generates a desired wave spectrum and an ideal spectrum based on the received radio wave. The spectrum generation unit 40 further generates an off-the-air period spectrum based on the received radio wave during a period for which the desired wave is not transmitted, and an interference wave spectrum of an interference wave detected by an interference wave detection unit 422, which will be described later.

The detection unit 42 includes, for example, a reception level detection unit 420 and the interference wave detection unit 422, and outputs the results of detection made by the two detection units to the spectrum generation unit 40 and the determination unit 44.

The reception level detection unit 420 detects the reception level of the desired wave based on the spectra generated by the spectrum generation unit 40, and outputs the detected reception level to the spectrum generation unit 40 and the determination unit 44. For example, the reception level detection unit 420 detects the reception level in the form of the sum of the received electric power over the frequency channel width of the desired wave spectrum generated by the spectrum generation unit 40.

The interference wave detection unit 422 detects an interference wave in the spectrum of the desired wave based, for example, on the off-the-air period spectrum described above, and outputs the detected interference wave to the spectrum generation unit 40 and the determination unit 44.

The determination unit 44 determines whether or not information based on the spectra generated by the spectrum generation unit 40 includes a factor that prevents maintenance of the quality of the received radio wave based on a determination criterion specified in advance, and outputs the determined result and the determination criterion to the identification unit 46.

For example, the determination unit 44 determines whether or not the desired wave reception level detected by the reception level detection unit 420 is smaller than a predetermined value. The determination unit 44 further determines whether or not there is a bandwidth over which the reception level of the desired wave spectrum decreases by a predetermined value or greater with respect to the ideal spectrum. The determination unit 44 further determines whether or not the sum of the bandwidths over which the reception level of the desired wave spectrum decreases with respect to the ideal spectrum is a predetermined value or greater.

The determination unit 44 further determines whether or not the electric power of the interference wave is greater than or equal to a predetermined value, whether or not the spectrum of the interference wave matches that of a known radio wave, and whether or not the bandwidth exclusively used by the interference wave exceeds the bandwidth exclusively used by the known radio wave.

The identification unit 46 identifies a factor that prevents maintenance of the quality of the received radio wave based on the results determined by the determination unit 44 and the determination criterion described above, and outputs information representing the identified factor and other pieces of information as the analysis result to the output unit 22.

For example, when the determination unit 44 determines that the reception level of the desired wave is lower than the predetermined value, the identification unit 46 identifies the low reception level of the desired wave as the factor that prevents maintenance of the quality of the received radio wave. When there is a bandwidth over which the reception level of the desired wave spectrum decreases by the predetermined value or greater, or when the sum of the bandwidths over which the reception level of the desired wave spectrum decreases is greater than or equal to the predetermined value, the identification unit 46 identifies the magnitude of distortion of the spectrum as the factor that prevents maintenance of the quality of the received radio wave.

When the determination unit 44 determines that the electric power of the interference wave is greater than or equal to the predetermined value, the identification unit 46 identifies the presence of interference wave as the factor that prevents maintenance of the quality of the received radio wave. The identification unit 46 further identifies presence of another device that issues the known radio wave having a spectrum determined by the determination unit 44 to match the spectrum of the interference wave as the factor that prevents maintenance of the quality of the received radio wave. When the determination unit 44 determines that the bandwidth exclusively used by the interference wave exceeds the bandwidth exclusively used by the known radio wave, the identification unit 46 identifies radio wave noise as the factor that prevents maintenance of the quality of the received radio wave.

It is noted that the information outputted by the analysis unit 4 to the output unit 22 (result of analysis) may include all the information outputted by the units that form the analysis unit 4. For example, the output unit 22 may display the result outputted by each of the spectrum generation unit 40, the detection unit 42, the determination unit 44, and the identification unit 46.

Figure 3:
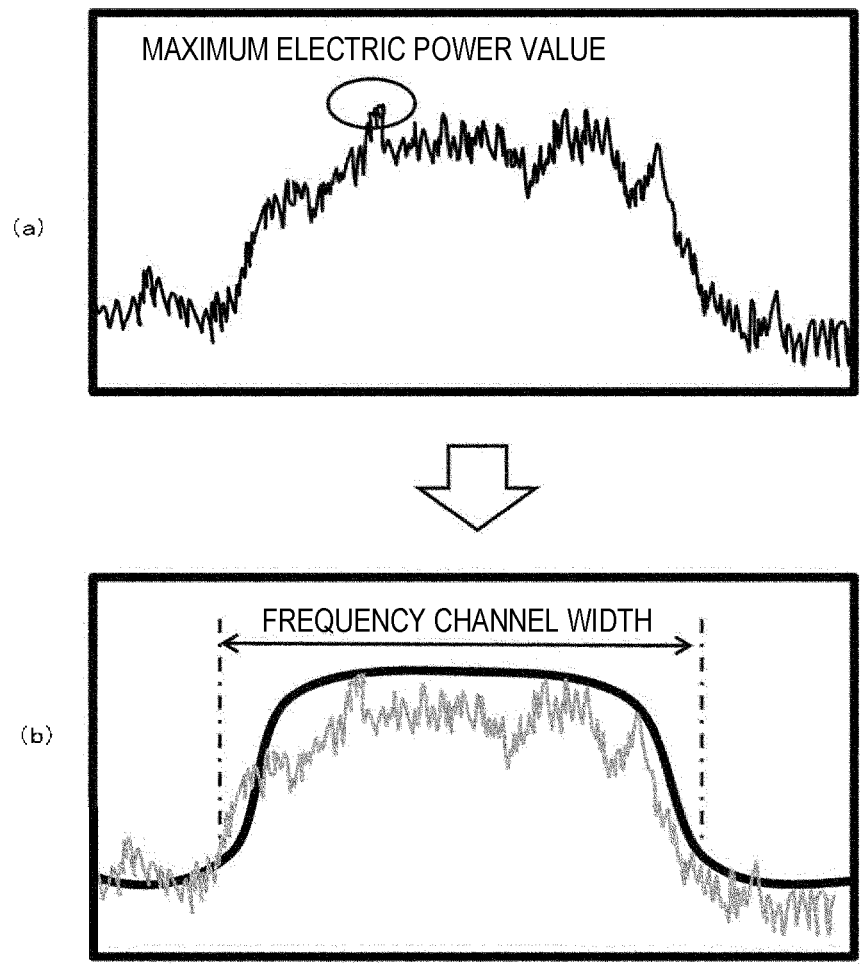
FIG. 3(a) illustrates a desired wave spectrum generated by a spectrum generation unit based on a received radio wave as the result of display provided by an output unit.
FIG. 3(b) illustrates a desired wave ideal spectrum generated by the spectrum generation unit as the result of display provided by the output unit.

An example of the action of the degradation factor detection device 1 will next be described. FIG. 3 shows the process in which the spectrum generation unit 40 generates a spectrum in a first action performed by the degradation factor detection device 1. FIG. 3(*a*) illustrates the desired wave spectrum generated by the spectrum generation unit 40 based on the received radio wave as the result of display provided by the output unit 22. FIG. 3(*b*) illustrates the desired wave ideal spectrum generated by the spectrum generation unit 40 as the result of display provided by the output unit 22.

When a desired wave's center frequency specified by the user is inputted via the input unit 20, the spectrum generation unit 40 generates the desired wave spectrum shown in FIG. 3(*a*) based on the received radio wave. In this process, the spectrum generation unit 40 also acquires a maximum electric power value in the frequency channel width in the desired wave spectrum.

The spectrum generation unit 40 then generates the desired wave ideal spectrum shown in FIG. 3(*b*) in accordance with the acquired maximum electric power value. In this process, the output unit 22 displays the desired wave spectrum based on the received radio wave and the desired wave ideal spectrum with the two spectra distinguished from each other (FIG. 3(*b*)).

Figure 4:
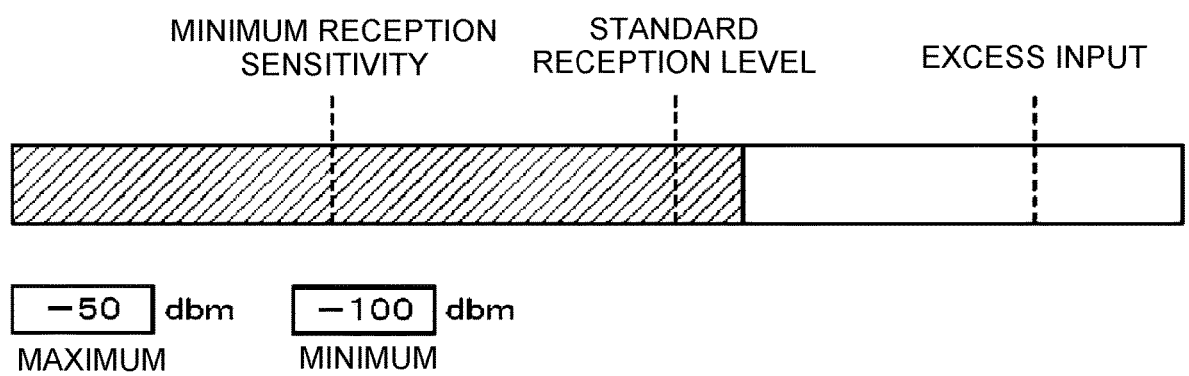
FIG. 4 illustrates a desired wave reception level detected by a reception level detection unit in a first action performed by the degradation factor detection device as the result of display provided by the output unit.

FIG. 4 illustrates the desired wave reception level detected by the reception level detection unit 420 in the first action performed by the degradation factor detection device 1 as the result of display provided by the output unit 22. The reception level detection unit 420 detects the reception level in the form of the sum of the received electric power over the frequency channel width of the desired wave spectrum generated by the spectrum generation unit 40, as described above.

Figure 5:
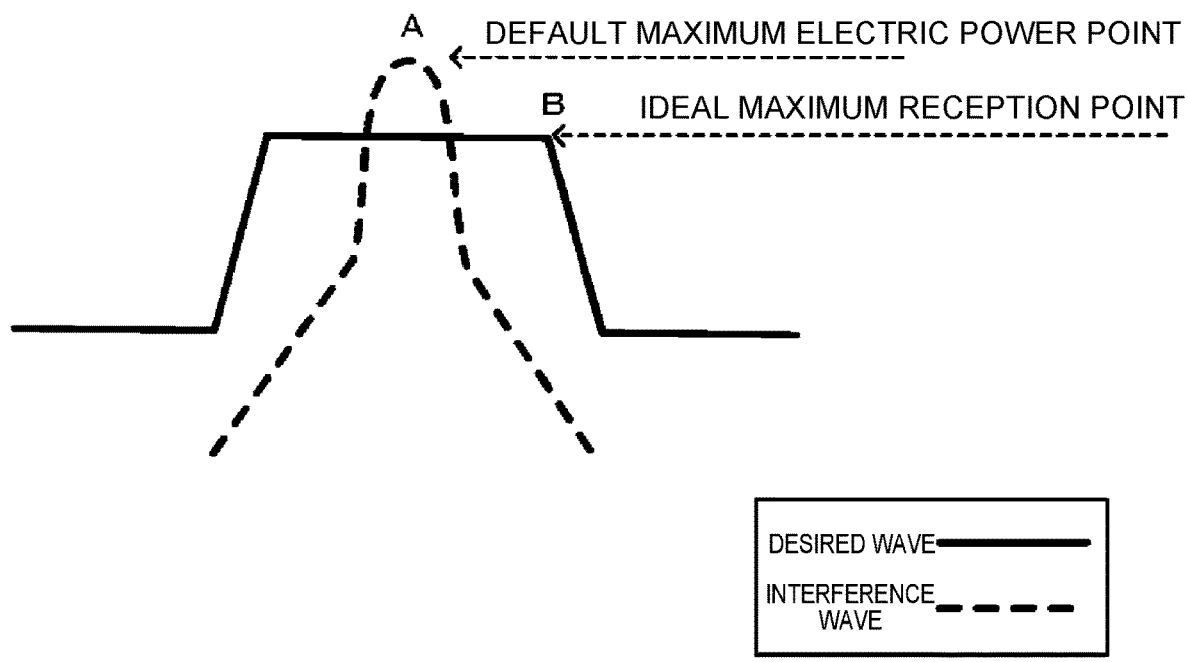
FIG. 5 diagrammatically shows a state in which the band of the desired wave spectrum overlaps with the band of an interference wave spectrum in the first action performed by the degradation factor detection device.

FIG. 5 diagrammatically shows a state in which the band of the desired wave spectrum overlaps with the band of the interference wave spectrum in the first action performed by the degradation factor detection device 1. When the band of the desired wave spectrum overlaps (is covered) with the band of the interference wave spectrum, a default maximum electric power point of the spectrum is a point A. The maximum electric power point of the ideal spectrum is, however, a point B.

FIG. 6 diagrammatically shows a process performed by the degradation factor detection device 1 in the first action when the band of the desired wave spectrum overlaps with the band of the interference wave spectrum. FIG. 6(*a*) diagrammatically shows a case where the desired wave and the interference wave are simultaneously transmitted and the spectrum generated by the spectrum generation unit 40 during the period for which the desired wave is not transmitted. FIG. 6(*b*) diagrammatically shows the result of the process performed by the degradation factor detection device 1 in the first action.

Even when the band of the desired wave spectrum overlaps with the band of the interference wave spectrum, the spectrum generation unit 40 generates only the interference wave spectrum during the period for which the device that transmits the desired wave periodically stops the transmission or the period for which the user stops transmitting the desired wave (FIG. 6(a)).

Thereafter, in the first action performed by the degradation factor detection device 1, the spectrum generation unit 40 performs the process of removing the interference wave spectrum from the spectrum of a combined wave that is the combination of the desired wave and the interference wave, and then acquires the maximum electric power value to generate the desired wave ideal spectrum. That is, the output unit 22 can display the desired wave ideal spectrum.

Figure 7:
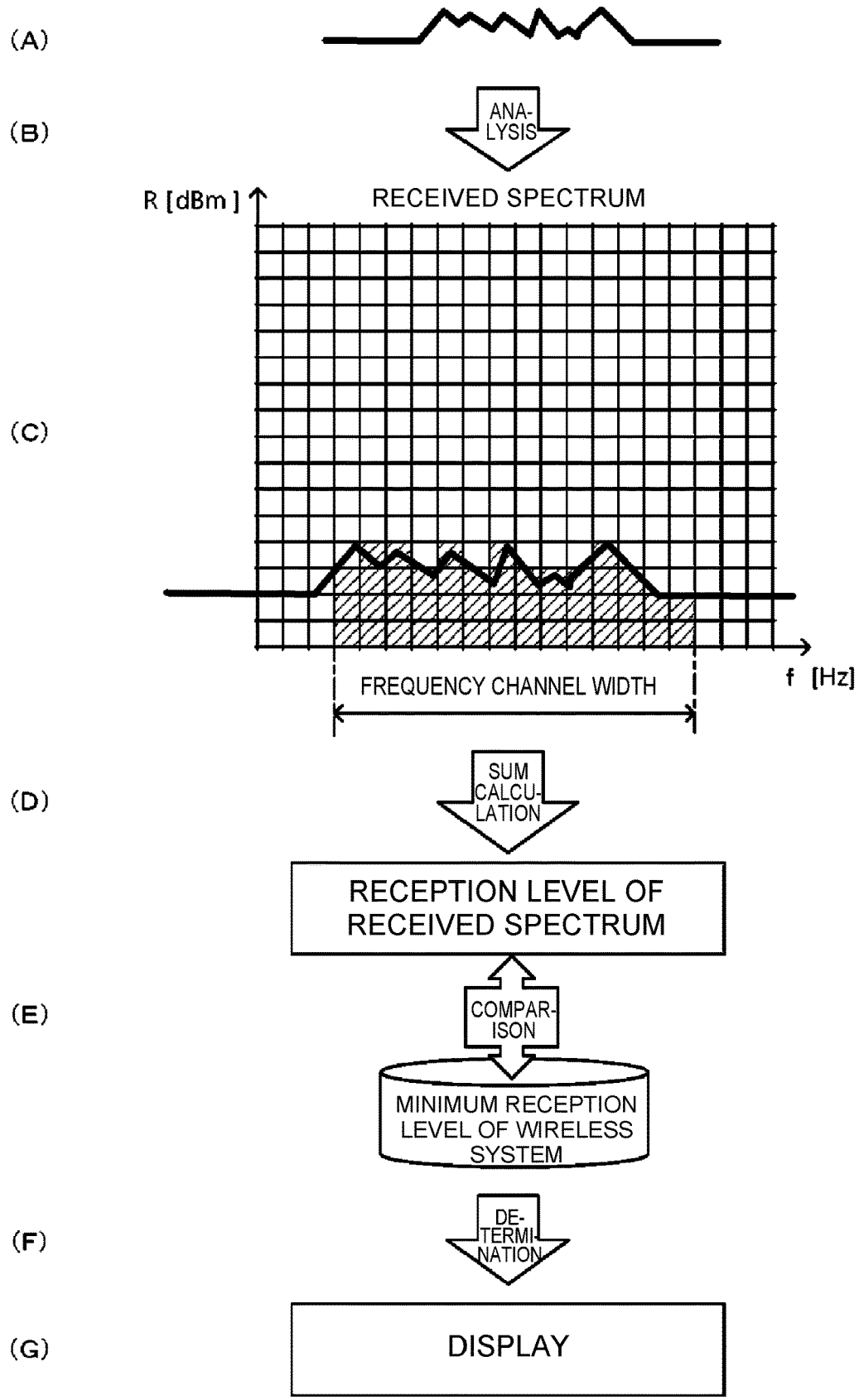
FIG. 7 diagrammatically shows the procedure of a second action performed by the degradation factor detection device.

A second action performed by the degradation factor detection device 1 will next be described. FIG. 7 diagrammatically shows the procedure of the second action performed by the degradation factor detection device 1. The degradation factor detection device 1 performs analysis (B) on a spectrum (A) generated by the spectrum generation unit 40.

For example, the reception level detection unit 420 calculates the sum of the received electric power over the frequency channel width (C) of a received spectrum (D) and sets the result of the calculation as the reception level of the received spectrum (E).

The determination unit 44 compares the reception level of the received spectrum with a minimum reception level necessary for a device that receives the desired wave, for example, a wireless system, to maintain the quality of the received radio wave (E), and determines whether or not the reception level of the desired wave is lower than a predetermined value (F).

The output unit 22 then displays, for example, a result identified by the identification unit 46 based on the result of the determination made by the determination unit 44 (G). For example, when the reception level is lower than the minimum reception level, the output unit 22 displays information representing that the low reception level is the factor that prevents maintenance of the quality of the received radio wave.

Figure 8:
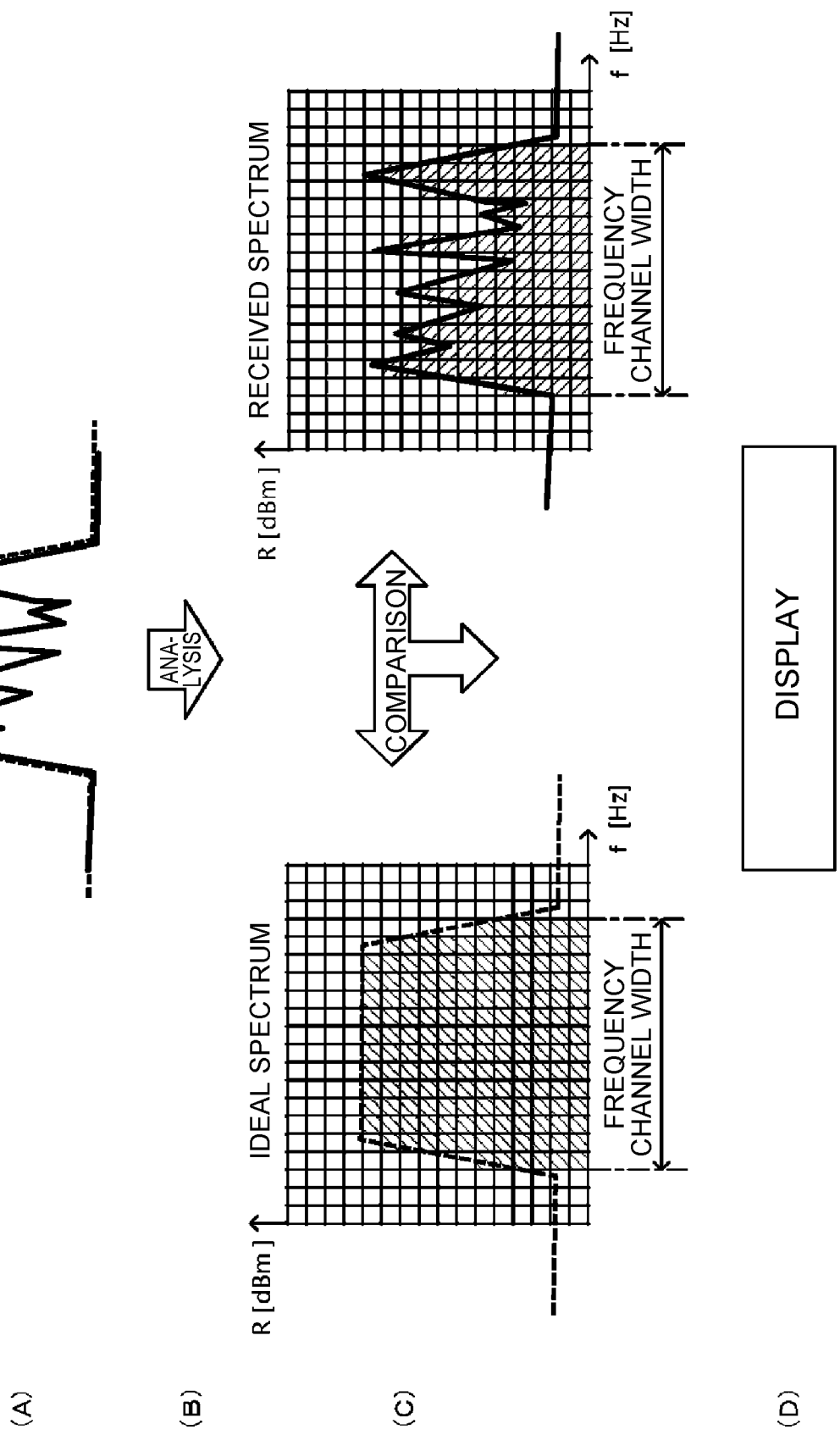
FIG. 8 diagrammatically shows the procedure of a third action performed by the degradation factor detection device.

A third action performed by the degradation factor detection device 1 will next be described. FIG. 8 diagrammatically shows the procedure of the third action performed by the degradation factor detection device 1. The degradation factor detection device 1 performs the analysis (B) on the spectrum (A) generated by the spectrum generation unit 40.

For example, the reception level detection unit 420 calculates the sum of the received electric power over each of the frequency channel width of the received spectrum and the frequency channel width of the ideal spectrum. The determination unit 44 then determines through comparison whether or not there is a bandwidth over which the reception level of the received spectrum decreases by a predetermined value or greater with respect to the ideal spectrum, or whether or not the sum of the bandwidths over which the reception level of the received spectrum decreases with respect to the ideal spectrum is greater than or equal to a predetermined value (C).

The output unit 22 then displays, for example, a result identified by the identification unit 46 based on the result of the determination made by the determination unit 44 (D). For example, when there is a bandwidth over which the reception level of the received spectrum decreases by the predetermined value or greater with respect to the ideal spectrum, or when the sum of the bandwidths over which the reception level of the received spectrum decreases with respect to the ideal spectrum is greater than or equal to the predetermined value, the output unit 22 displays information representing that a large amount of distortion of the spectrum is the factor that prevents maintenance of the quality of the received radio wave.

Conceivable examples of the factor that increases the distortion of the spectrum may include distortion produced by a transmission amplifier of a device that transmits the radio wave, the effect of multipath propagation along the propagation path, and the effect of fading that occurs along the propagation path.

A fourth action performed by the degradation factor detection device 1 will next be described. FIG. 9 diagrammatically shows the procedure of the fourth action performed by the degradation factor detection device 1. In the degradation factor detection device 1, the spectrum generation unit 40 first generates a spectrum formed of the desired wave and the interference wave that overlap with each other (A).

Thereafter, when the acquisition unit 32 acquires the radio wave information from the radio wave reception unit 31 during the period for which the device that transmits the desired wave periodically stops the transmission or during the period for which the user stops transmitting the desired wave (B), the spectrum generation unit 40 generates the interference wave spectrum (off-the-air period spectrum) (C).

The determination unit 44 determines whether or not the electric power indicated by the interference wave spectrum present in the frequency channel width of the received spectrum is greater than or equal to a predetermined value (D).

The output unit 22 then displays, for example, a result identified by the identification unit 46 based on the result of the determination made by the determination unit 44 (E). For example, when the electric power indicated by the interference wave spectrum is greater than or equal to the predetermined value, the output unit 22 displays information representing that the presence of the interference wave is the factor that prevents maintenance of the quality of the received radio wave.

As an example of a fifth action of the degradation factor detection device 1, the determination unit 44 determines whether or not the spectrum of the interference wave detected by the interference wave detection unit 422 matches the spectrum of any of known radio waves (spectrum masks) stored by the storage unit 30. The determination unit 44 instead determines whether or not a demodulated synchronization word of the interference wave matches the synchronization word of any of known radio waves stored by the storage unit 30.

When the determination unit 44 determines that the two spectrum masks or synchronization words match each other, the output unit 22 displays information representing that the presence of another device that issues the known radio wave having a spectrum determined to match the spectrum of the interference wave is the factor that prevents maintenance of the quality of the received radio wave (name of wireless communication system, for example).

As an example of a sixth action of the degradation factor detection device 1, for example, when the determination unit 44 determines that the spectrum of the interference wave does not match that of the known radio wave, the determination unit 44 further determines whether or not the bandwidth exclusively used by the interference wave exceeds the bandwidth exclusively used by the known radio wave.

Thereafter, when the determination unit 44 determines that the bandwidth exclusively used by the interference wave exceeds the bandwidth exclusively used by the known radio wave, the output unit 22 displays information representing that the radio wave noise is the factor that prevents maintenance of the quality of the received radio wave.

Figure 10:
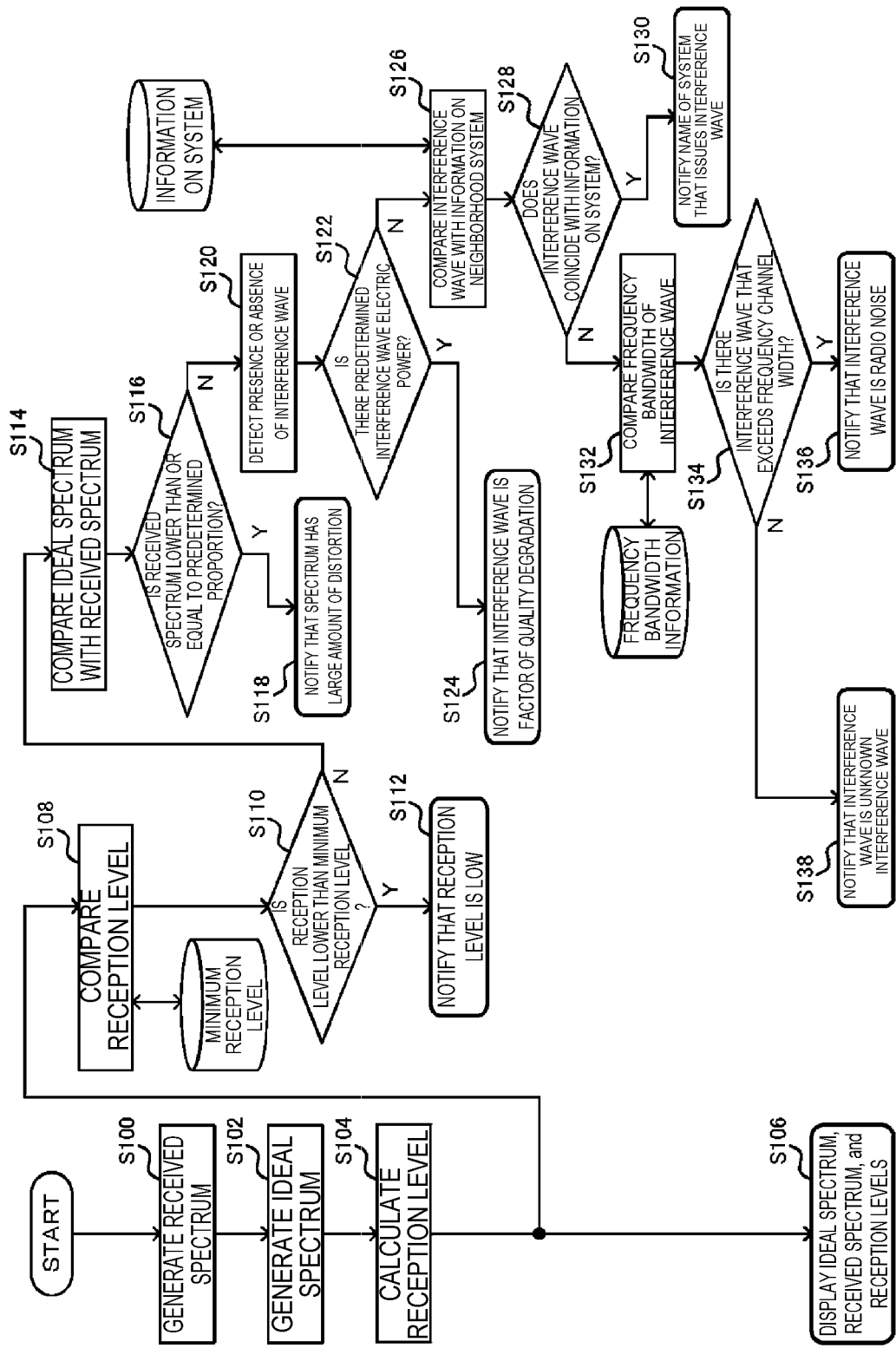
FIG. 10 illustrates the procedure of the overall action of the degradation factor detection device.

An example of the overall action of the degradation factor detection device 1 will next be described. FIG. 10 illustrates the procedure of the overall action of the degradation factor detection device 1.

The degradation factor detection device 1 first generates the received spectrum (S100), generates the ideal spectrum (S102), and calculates the reception level based on each of the received spectrum and the ideal spectrum (S104).

The degradation factor detection device 1 then causes the output unit 22 to display the ideal spectrum, the received spectrum, and the reception levels of the received spectrum and the ideal spectrum (S106).

Furthermore, the degradation factor detection device 1 compares the reception level based on the received spectrum with the minimum reception level of the desired wave stored by the storage unit 30 (S108) to determine whether or not the reception level is lower than the minimum reception level (S110).

When determining that the reception level is lower than the minimum reception level (Yes in S110), the degradation factor detection device 1 notifies the maintenance worker that the reception level of the desired wave is low (S112), and in the other cases (No in S110), the degradation factor detection device 1 proceeds to the process in S114.

In the process in S114, the degradation factor detection device 1 compares the electric power of the ideal spectrum with the electric power of the received spectrum (S114) and determines, for example, whether or not the electric power of the received spectrum is lower than or equal to a predetermined proportion of the electric power of the ideal spectrum (S116).

When determining that the electric power of the received spectrum is lower than or equal to the predetermined proportion of the electric power of the ideal spectrum (Yes in S116), the degradation factor detection device 1 notifies the maintenance worker that the spectrum has a large amount of distortion (S118), and in the other cases (No in S116), the degradation factor detection device 1 proceeds to the process in S120.

In the process in S120, the degradation factor detection device 1 detects presence or absence of an interference wave that causes degradation of the quality of the desired wave (S120) and determines whether or not there is interference wave electric power greater than or equal to a predetermined value in the frequency channel width of the desired wave (S122).

When determining that there is interference wave electric power greater than or equal to the predetermined value (Yes in S122), the degradation factor detection device 1 notifies the maintenance worker that the interference wave is the factor of the quality degradation (S124), and in the other cases (No in S122), the degradation factor detection device 1 proceeds to the process in S126.

The degradation factor detection device 1 then compares the specifications of a neighborhood known system (device) stored by the storage unit 30 with the interference wave (S126) and determines whether or not the interference wave coincides with the specifications of the neighborhood known system (S128).

When determining that the interference wave coincides with the specifications of the neighborhood known system (Yes in S128), the degradation factor detection device 1 notifies the maintenance worker of the name of the system that issues the interference wave (S130), and in the other cases (No in S128), the degradation factor detection device 1 proceeds to the process in S132.

The degradation factor detection device 1 compares information on the frequency bandwidth of the known system stored by the storage unit 30 with the frequency bandwidth of the interference wave (S132) to determine whether or not there is an interference wave that exceeds the frequency channel width (S134).

When determining that there is an interference wave that exceeds the frequency channel width (Yes in S134), the degradation factor detection device 1 notifies the maintenance worker that the interference wave is the radio noise (S136). When determining that there is no interference wave that exceeds the frequency channel width (No in S134), the degradation factor detection device 1 notifies the maintenance worker that the interference wave is an unknown interference wave (S138).

Since the degradation factor detection device 1 determines whether or not information based on the generated spectrum contains a factor that prevents maintenance of the quality of the received radio wave based on the determination criterion specified in advance, the factor of the quality degradation in the wireless communication can be readily detected.

Each function of the degradation factor detection device 1 may be partially or entirely achieved by hardware, such as a PLD (programmable logic device) or an FPGA (field programmable gate array), or may be achieved by a program executed by a processor, such as a CPU.

For example, the degradation factor detection device 1 according to the present invention can be realized by using a computer and a program, and the program can be recorded on a storage medium or provided over a network.

FIG. 11 shows an example of the hardware configuration of the degradation factor detection device 1 according to the embodiment. The degradation factor detection device 1 includes, for example, an input unit 50, an output unit 51, a communication unit 52, a CPU 53, a memory 54, and an HDD 55 connected to each other via a bus 56, as shown in FIG. 11, and has functions as a computer. The degradation factor detection device 1 is configured to be capable of inputting and outputting data to and from a computer readable storage medium 57.

The input unit 50 is, for example, a keyboard and a mouse, and corresponds to the input unit 20 described above. The output unit 51 is, for example, a display device, such as a display, and corresponds to the output unit 22 described above. The communication unit 52 is, for example, a wireless network interface.

The CPU 53 controls each of the units that form the degradation factor detection device 1 and performs, for example, predetermined processes. The memory 54 and the HDD 55 correspond to the aforementioned storage unit 30, which stores data and other pieces of information. The storage medium 57 is configured to be capable of storing, for example, a program that provides the functions of the degradation factor detection device 1. The architecture that configures the degradation factor detection device 1 is not limited to the example shown in FIG. 11.

That is, the term "computer" used herein is intended to include an OS and hardware, such as peripheral instruments. The term "computer readable storage medium" refers to a storage device, such as a flexible disk, a magneto-optical disk, a ROM, a CD-ROM, and other portable media. Furthermore, the term "computer readable recording medium" may encompass a component that dynamically holds a program for a short period, such as a communication line in a case where the program is transmitted over the Internet or any other network or a telephone circuit or any other communication circuit, or a component that holds a program for a fixed period, such as a volatile memory in a computer that works as a server or a client in the case described above.

The embodiment of the present invention has been described above with reference to the drawings, but it is apparent that the embodiment described above is only an example of the present invention, and that the present invention is not limited to the embodiment described above. Therefore, components may be added, omitted, replaced, or otherwise modified to the extent that the addition, omission, replacement, or modification do not depart from the technical idea and scope of the present invention.

REFERENCE SIGNS LIST

1 Degradation factor detection apparatus
2 UI unit
3 Detection processing unit
4 Analysis unit
10 Antenna
20 Input unit
22 Output unit
30 Storage unit
31 Radio wave reception unit
32 Acquisition unit
33 Demodulation unit
40 Spectrum generation unit
42 Detection unit
44 Determination unit
46 Identification unit
50 Input unit
51 Output unit
52 Communication unit
53 CPU
54 Memory
55 HDD
56 Bus
57 Storage medium
300 Primary wave specification information storage unit
301 Neighborhood specification information storage unit
302 Frequency information storage unit
420 Reception level detection unit
422 Interference wave detection unit

The invention claimed is:

1. A wireless quality degradation factor detection method comprising:
a spectrum generation step of generating a spectrum based on a received radio wave;
a reception level detection step of detecting a reception level of a desired wave based on the generated spectrum;
a determination step of determining whether or not information about the generated spectrum includes a factor that prevents quality of the received radio wave from being maintained based on a determination criterion specified in advance, wherein the determination step includes determining whether or not the detected reception level of the desired wave is less than a predetermined value;
an identification step of identifying the factor based on a result of the determination and the determination criterion, wherein the identification step includes identifying based on the determination step determining that the reception level of the desired wave is less than the predetermined value, a low reception level of the desired wave as the factor that prevents the quality of the received radio wave from being maintained; and
an output step of outputting information representing the identified factor.

2. The wireless quality degradation factor detection method according to claim 1,
wherein the spectrum generation step includes generating a desired wave spectrum and an ideal spectrum based on the received radio wave,
wherein the determination step includes determining (i) presence of a bandwidth over which the reception level of the desired wave spectrum decreases by a predetermined value or greater with respect to the ideal spectrum or (ii) whether or not a sum of bandwidths over which the reception level of the desired wave spectrum decreases with respect to the ideal spectrum is a predetermined value or greater, and
wherein the identification step includes identifying, based on (i) the bandwidth being determined to be present or (ii) the sum of the bandwidths being determined to be greater than or equal to the predetermined value, a magnitude of distortion of the spectrum as the factor that prevents the quality of the received radio wave from being maintained.

3. The wireless quality degradation factor detection method according to claim 1,
wherein the spectrum generation step further includes generating an off-the-air period spectrum based on the received radio wave during a period for which a desired wave is not transmitted,
wherein the method further comprises an interference wave detection step of detecting an interference wave in the spectrum of the desired wave based on the off-the-air period spectrum,
wherein the determination step includes determining whether or not electric power of the interference wave is greater than or equal to a predetermined value, and
wherein the identification step includes identifying, based on the determination step determining that the electric power of the interference wave is greater than or equal to the predetermined value, presence of the interference wave as the factor that prevents the quality of the received radio wave from being maintained.

4. The wireless quality degradation factor detection method according to claim 3,
wherein the spectrum generation step further include generating an interference wave spectrum of the interference wave,
wherein the determination step includes determining whether or not the interference wave spectrum matches a spectrum of a known radio wave, and
wherein the identification step includes identifying presence of another device that issues the known radio wave having a spectrum determined in the determination step to match the interference wave spectrum as the factor that prevents the quality of the received radio wave from being maintained.

5. The wireless quality degradation factor detection method according to claim 4,
wherein the determination step further includes determining, based on a determination that the interference wave spectrum does not match the spectrum of the known radio wave, whether or not a bandwidth exclusively used by the interference wave exceeds a bandwidth exclusively used by the known radio wave, and wherein the identification step includes identifying, based on the determination step determining that the bandwidth exclusively used by the interference wave exceeds the bandwidth exclusively used by the known radio wave, radio wave noise as the factor that prevents the quality of the received radio wave from being maintained.

6. A radio quality degradation factor detection device comprising:
 a spectrum generation unit, implemented using one or more computing devices, that is configured to generate a spectrum based on a received radio wave;
 a reception level detection unit, implemented using one or more computing devices, that is configured to detect a reception level of a desired wave based on the generated spectrum;
 a determination unit, implemented using one or more computing devices, that is configured to determine whether or not information about the generated spectrum includes a factor that prevents quality of the received radio wave from being maintained based on a determination criterion specified in advance, wherein the determination unit is configured to determine whether or not the detected reception level of the desired wave is less than a predetermined value;
 an identification unit, implemented using one or more computing devices, that is configured to identify the factor based on a result determined by the determination unit and the determination criterion, wherein the identification unit is configured to identify, based on the determination unit determining that the reception level of the desired wave is less than the predetermined value, a low reception level of the desired wave as the factor that prevents the quality of the received radio wave from being maintained; and
 an output unit, implemented using one or more computing devices, that is configured to output information representing the factor identified by the identification unit.

7. The radio quality degradation factor detection device according to claim 6,
 wherein the spectrum generation unit is configured to generate a desired wave spectrum and an ideal spectrum based on the received radio wave,
 wherein the determination unit is configured to determine (i) presence of a bandwidth over which the reception level of the desired wave spectrum decreases by a predetermined value or greater with respect to the ideal spectrum or (ii) whether or not a sum of bandwidths over which the reception level of the desired wave spectrum decreases with respect to the ideal spectrum is a predetermined value or greater, and
 wherein the identification unit is configured to identify, based on (i) the bandwidth being determined to be present or (ii) the sum of the bandwidths being determined to be greater than or equal to the predetermined value, a magnitude of distortion of the spectrum as the factor that prevents the quality of the received radio wave from being maintained.

8. The radio quality degradation factor detection device according to claim 6,
 wherein the spectrum generation unit is configured to generate an off-the-air period spectrum based on the received radio wave during a period for which a desired wave is not transmitted,
 wherein the radio quality degradation factor detection device further comprises an interference wave detection unit configured to detect an interference wave in the spectrum of the desired wave based on the off-the-air period spectrum,
 wherein the determination unit is configured to determine whether or not electric power of the interference wave is greater than or equal to a predetermined value, and
 wherein the identification unit is configured to identify, based on the determination unit determining that the electric power of the interference wave is greater than or equal to the predetermined value, presence of the interference wave as the factor that prevents the quality of the received radio wave from being maintained.

9. The radio quality degradation factor detection device according to claim 8,
 wherein the spectrum generation unit is configured to generate an interference wave spectrum of the interference wave,
 wherein the determination unit is configured to determine whether or not the interference wave spectrum matches a spectrum of a known radio wave, and
 wherein the identification unit is configured to identify presence of another device that issues the known radio wave having a spectrum determined by the determination unit to match the interference wave spectrum as the factor that prevents the quality of the received radio wave from being maintained.

10. The radio quality degradation factor detection device according to claim 9,
 wherein the determination unit is configured to determine, based on a determination that the interference wave spectrum does not match the spectrum of the known radio wave, whether or not a bandwidth exclusively used by the interference wave exceeds a bandwidth exclusively used by the known radio wave, and
 wherein the identification unit is configured to identify, based on the determination unit determining that the bandwidth exclusively used by the interference wave exceeds the bandwidth exclusively used by the known radio wave, radio wave noise as the factor that prevents the quality of the received radio wave from being maintained.

11. A non-transitory computer readable medium storing a wireless quality degradation factor detection program, wherein execution of the factor detection program causes one or more computers to perform operations comprising:
 a spectrum generation step of generating a spectrum based on a received radio wave;
 a reception level detection step of detecting a reception level of a desired wave based on the generated spectrum;
 a determination step of determining whether or not information about the generated spectrum includes a factor that prevents quality of the received radio wave from being maintained based on a determination criterion specified in advance, wherein the determination step includes determining whether or not the detected reception level of the desired wave is less than a predetermined value;
 an identification step of identifying the factor based on a result of the determination and the determination criterion, wherein the identification step includes identifying based on the determination step determining that the reception level of the desired wave is less than the predetermined value, a low reception level of the desired wave as the factor that prevents the quality of the received radio wave from being maintained; and an output step of outputting information representing the identified factor.

12. The non-transitory computer readable medium according to claim 11, wherein the spectrum generation step includes generating a desired wave spectrum and an ideal spectrum based on the received radio wave, wherein the determination step includes determining (i) presence of a bandwidth over which the reception level of the desired wave spectrum decreases by a predetermined value or greater with respect to the ideal spectrum or (ii) whether or not a sum of bandwidths over which the reception level of the desired wave spectrum decreases with respect to the ideal spectrum is a predetermined value or greater, and wherein the identification step includes identifying, based on (i) the bandwidth being determined to be present or (ii) the sum of the bandwidths being determined to be greater than or equal to the predetermined value, a magnitude of distortion of the spectrum as the factor that prevents the quality of the received radio wave from being maintained.

13. The non-transitory computer readable medium according to claim 12, wherein the spectrum generation step further includes generating an off-the-air period spectrum based on the received radio wave during a period for which the desired wave is not transmitted, wherein the operations further comprise an interference wave detection step of detecting an interference wave in the spectrum of the desired wave based on the off-the-air period spectrum, wherein the determination step includes determining whether or not electric power of the interference wave is greater than or equal to a predetermined value, and wherein the identification step includes identifying, based on the determination step determining that the electric power of the interference wave is greater than or equal to the predetermined value, presence of the interference wave as the factor that prevents the quality of the received radio wave from being maintained.

14. The non-transitory computer readable medium according to claim 13, wherein the spectrum generation step further include generating an interference wave spectrum of the interference wave, wherein the determination step includes determining whether or not the interference wave spectrum matches a spectrum of a known radio wave, and wherein the identification step includes identifying presence of another device that issues the known radio wave having a spectrum determined in the determination step to match the interference wave spectrum as the factor that prevents the quality of the received radio wave from being maintained.

15. The non-transitory computer readable medium according to claim 14, wherein the determination step further includes determining, based on a determination that the interference wave spectrum does not match the spectrum of the known radio wave, whether or not a bandwidth exclusively used by the interference wave exceeds a bandwidth exclusively used by the known radio wave, and wherein the identification step includes identifying, based on the determination step determining that the bandwidth exclusively used by the interference wave exceeds the bandwidth exclusively used by the known radio wave, radio wave noise as the factor that prevents the quality of the received radio wave from being maintained.

* * * * *